United States Patent
Lee et al.

(10) Patent No.: US 8,619,691 B2
(45) Date of Patent: Dec. 31, 2013

(54) RESOURCE ALLOCATION METHOD FOR CONTROL MESSAGE IN WIRELESS COMMUNICATION SYSTEM

(75) Inventors: Namsuk Lee, Daejeon (KR); Yong Seouk Choi, Daejeon (KR); Sook Jin Lee, Daejeon (KR)

(73) Assignee: Electronics and Telelcommunications Research Institute, Daejeon (KR)

( * ) Notice: Subject to any disclaimer, the term of this patent is extended or adjusted under 35 U.S.C. 154(b) by 258 days.

(21) Appl. No.: 13/040,801

(22) Filed: Mar. 4, 2011

(65) Prior Publication Data

US 2011/0216739 A1    Sep. 8, 2011

(30) Foreign Application Priority Data

Mar. 5, 2010  (KR) .................. 10-2010-0019665
Mar. 4, 2011  (KR) .................. 10-2011-0019651

(51) Int. Cl.
*H04W 4/00*  (2009.01)
(52) U.S. Cl.
USPC ........................................................ 370/329

(58) Field of Classification Search
None
See application file for complete search history.

(56) References Cited

U.S. PATENT DOCUMENTS

| 2010/0202378 A1 | 8/2010 | Youn et al. | |
| 2010/0254336 A1* | 10/2010 | Lee et al. | 370/329 |
| 2011/0026495 A1* | 2/2011 | Lee et al. | 370/335 |

FOREIGN PATENT DOCUMENTS

| KR | 10-2009-0012540 | 2/2009 |
| KR | 10-2010-0058923 | 6/2010 |

* cited by examiner

*Primary Examiner* — Jae Y Lee
(74) *Attorney, Agent, or Firm* — Staas & Halsey LLP

(57) ABSTRACT

The present invention relates to a resource allocation method of a base station. The method includes generating a packet data unit that includes a first field and a downlink control message, wherein the first field indicates whether unsolicited resource is to be allocated for an uplink control message, transmitting the generated packet data unit to the terminal, allocating resources for the uplink control message, and transmitting the allocated resources to the terminal.

8 Claims, 8 Drawing Sheets

RESOURCE ALLOCATION METHOD FOR CONTROL MESSAGE IN WIRELESS COMMUNICATION SYSTEM

CROSS-REFERENCE TO RELATED APPLICATION

This application claims priority to and the benefit of Korean Patent Application No. 10-2010-0019665 and 10-2011-0019651 filed in the Korean Intellectual Property Office on Mar. 5, 2010 and Mar. 4, 2011, the entire contents of which are incorporated herein by reference.

BACKGROUND OF THE INVENTION (a) Field of the Invention

The present invention relates a wireless communication system. More particularly, the present invention relates to a method for allocating resource for transmitting a control message in a wireless communication system.

(b) Description of the Related Art

A terminal uses uplink resource allocated from a base station to transmit uplink messages in a wireless communication system. For this purpose, the terminal requests a contention-based uplink bandwidth allocation to the base station. The contention-based uplink bandwidth allocation request may cause collision and transmission delay.

Particularly, the contention—based uplink bandwidth allocation request may be not proper for an uplink message that is a control message which is need to be instantly transmitted. Accordingly, it is necessary for a base station to have an efficient resource allocation method when a terminal transmits a control message to a base station.

SUMMARY OF THE INVENTION

The present invention has been made in an effort to provide a method for allocating uplink resource by a base station to transmit a control message of a terminal in a wireless communication system.

The present invention has been made in an effort to provide a method for transmitting a control message from a terminal to a base station in a wireless communication system.

An exemplary embodiment of the present invention provides a method for allocating resources for an uplink control message at a base station, the method includes generating a packet data unit that includes a first field and a downlink control message, wherein the first field indicates whether unsolicited resource is to be allocated for an uplink control message, transmitting the generated packet data unit to the terminal, allocating resources for the uplink control message and transmitting the allocated resources to the terminal.

Another exemplary embodiment of the present invention provides a method for transmitting an uplink control message at a terminal, the method includes receiving a packet data unit including a first field and a downlink control message, wherein the first field indicates whether or not a base station allocates unsolicited resource for the uplink control message, checking the first field when the uplink control message is generated, waiting unsolicited resource allocation to transmit the uplink control message for a first time when the first field indicates that the base station would allocate unsolicited resource for the uplink control message, and when the base station allocates resources for the uplink control message within the first time, transmitting the uplink control message using the allocated resources.

Still another exemplary embodiment of the present invention provides a method for transmitting a downlink control message at a base station, including generating a packet data unit including a common header, an expended header related to unsolicited resource allocation, and a downlink control message, and transmitting the packet data unit to a terminal.

Yet another exemplary embodiment of the present invention provides a hand-off method of a base station, including receiving a hand-off request message from a terminal; transmitting a hand-off command message to the terminal, wherein the hand-off command message includes a first field indicates whether unsolicited resource is to be allocated for a hand-off indication message of the terminal, allocating uplink resources for the hand-off indication message, and receiving the hand-off indication message from the terminal through allocated resource.

DETAILED DESCRIPTION OF THE EMBODIMENTS

Figure 1:
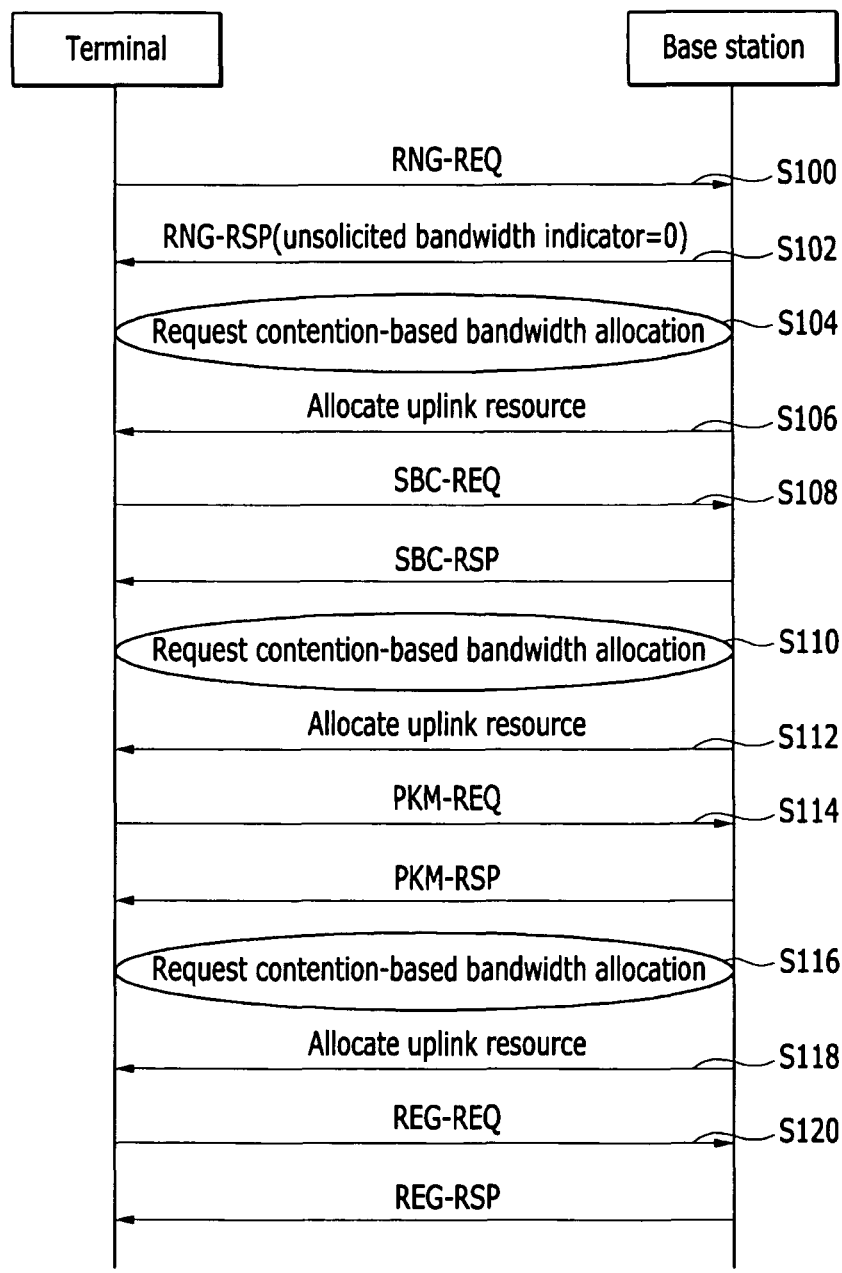
FIG. 1 is a flowchart that illustrates a method for transmitting a control message from a terminal for initial network access in a wireless communication system in accordance with an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise" and variations such as "comprises" or "comprising", will be understood to imply the inclusion of stated elements but not the exclusion of any other elements.

In the specification, a terminal may denote a mobile station (MS), a mobile terminal (MT), a subscriber station (SS), a portable subscriber station (PSS), user equipment (UE), and an access terminal (AT). The terminal may include all or some of functions in a terminal, a mobile station, a mobile terminal, a subscriber station, a portable subscriber station, user equipment, and an access terminal.

In the specification, a base station (BS) may denote an access node (AP), a radio access station (RAS), a node B, an evolved NodeB (eNodeB), a base transceiver station (BTS), and a mobile multi-hop relay base station (MMR-BS). The base station (BS) may include all or some of functions of an access node (AP), a radio access station (RAS), a node B, an evolved NodeB (eNodeB), a base transceiver station (BTS), and a mobile multi-hop relay base station (MMR-BS).

FIG. 1 is a flowchart that illustrates a method for transmitting a control message from a terminal for initial network access in a wireless communication system.

Referring to FIG. 1, a terminal transmits a ranging request message (RNG-REQ) to a base station at step S100. The base station transmits a ranging response message (RNG-RSP) to the terminal at step S102. The ranging response message may include an unsolicited bandwidth indictor. The unsolicited bandwidth indictor may be information indicating whether or not unsolicited resource is to be allocated.

When the unsolicited bandwidth indicator is 0, the terminal determines that unsolicited bandwidth is to be allocated and performs contention-based bandwidth allocation at steps S104, S110, and S116. At step S106, S112, and S118, the base station allocates uplink resource for transmitting a control message to the terminal through the contention-based bandwidth allocation.

At step S108, S114, and S120, the terminal transmits the control messages to the base station through the allocated uplink resource. For example, the control message for initial network access may be a SBC-REQ message for negotiating basic capability, a privacy key management request message (PKM-REQ) for managing a key, and a registration request message (REG-REQ) for registration.

Figure 2:
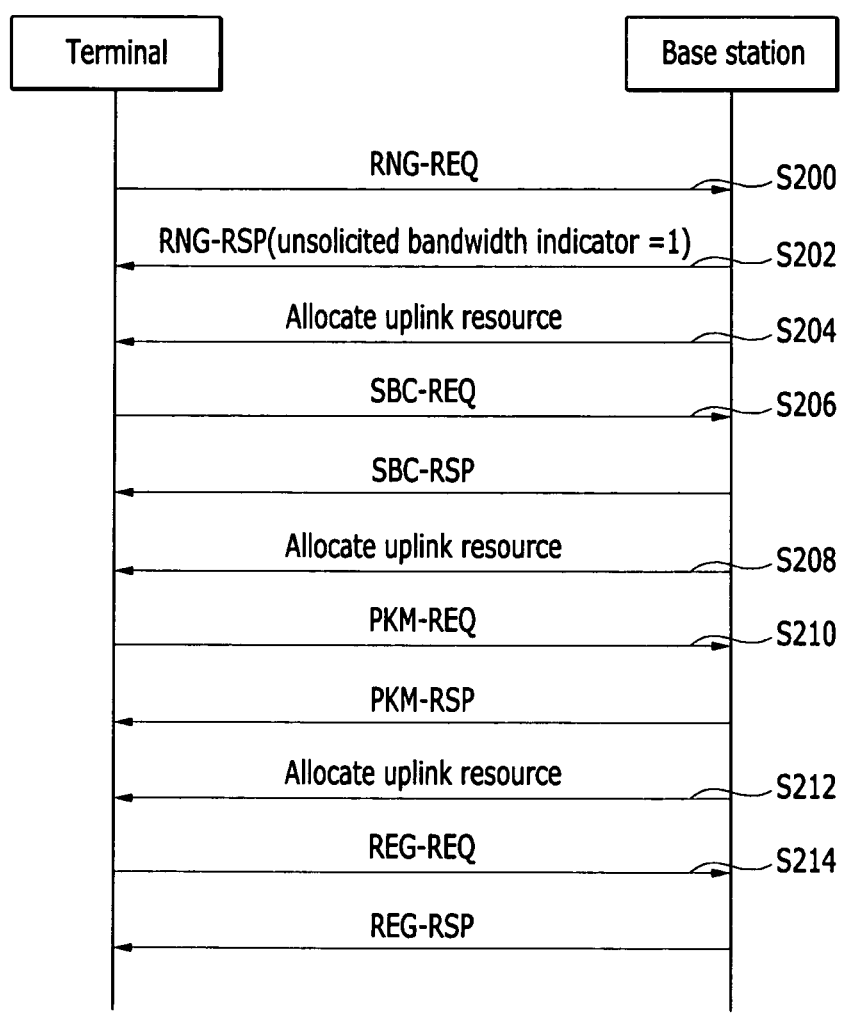
FIG. 2 is a flowchart that illustrates a method for transmitting a control message from a terminal for initial network access in a wireless communication system in accordance with another exemplary embodiment of the present invention.

FIG. 2 is a flowchart that illustrates a method for transmitting a control message from a terminal for initial network access in a wireless communication system.

Referring to FIG. 2, a terminal transmits a ranging request message (RNG-REQ) to a base station at step S200. The base station transmits a ranging response message (RNG-RSP) to the terminal at step S202. The ranging response message may include an unsolicited bandwidth indicator. The unsolicited bandwidth indicator is information indicating whether or not unsolicited resource is to be allocated.

When the unsolicited bandwidth indicator is 1, the terminal determines that unsolicited resource is to be allocated and waits resource to be allocated by the base station for a predetermined time. When the base station allocates uplink resources for transmitting a control message to the terminal within the predetermined time at steps S204, S208, and S212, the terminal transmits a control message to the base station through the allocated resource allocation at steps S206, S210, and S214. For example, the control message for initial network access may be a SBC-REQ message for negotiating basic capability, a privacy key management request message (PKM-REQ) for managing a key, and a registration request message (REG-REQ) for registration.

When the terminal is not allocated with uplink resources from the base station within a predetermined time, the terminal performs the contention-based bandwidth allocation procedure like that shown in FIG. 1.

As shown in FIG. 1 and FIG. 2, the base station can perform unsolicited resource allocation by including the unsolicited bandwidth indicator in the ranging response message during the initial network access procedure. However, the above described unsolicited resource allocation method is limited to the initial network access procedure. Except the initial network access procedure, a contention-based bandwidth request procedure is required to transmit control message from the terminal to the base station.

Hereinafter, an unsolicited resource allocation method of a base station according to an exemplary embodiment of the present invention will be described. The unsolicited resource allocation method can be used to transmit control messages for any procedure although it is not the initial network access procedure.

Figure 3:
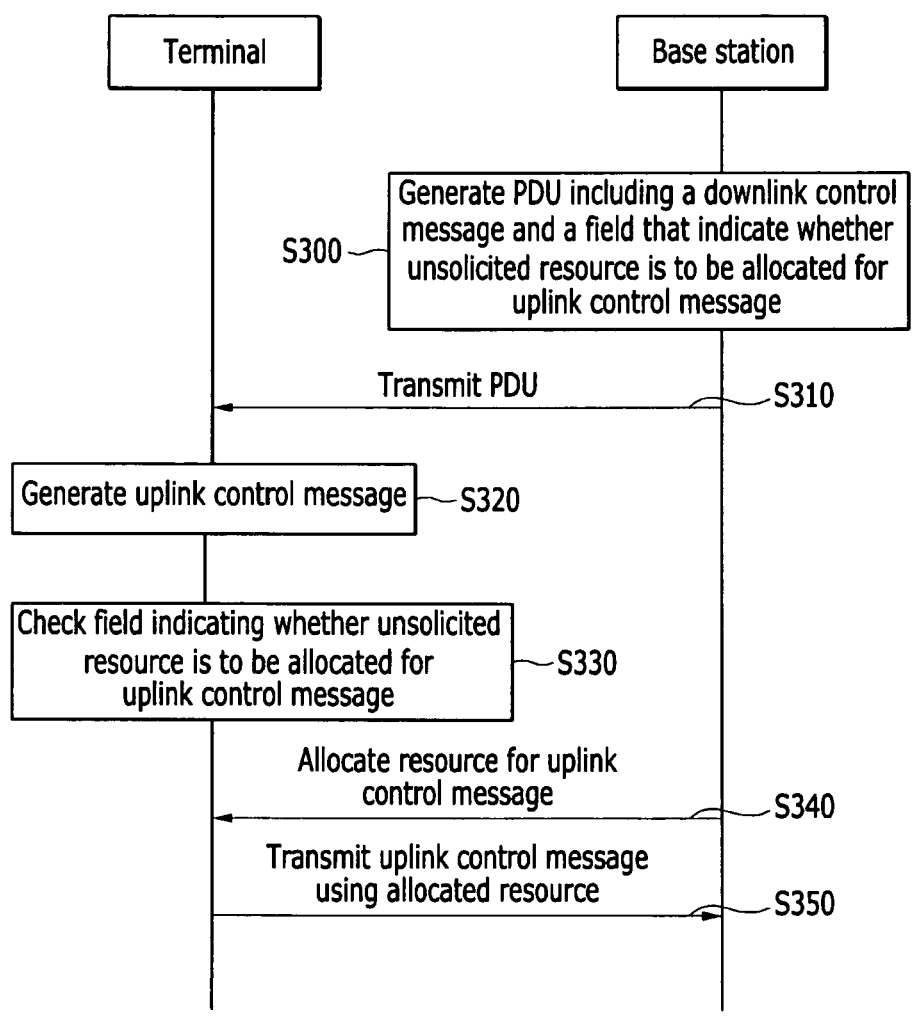
FIG. 3 is a flowchart that illustrates unsolicited resource allocation of a base station and uplink control message transmission of a terminal in accordance with an exemplary embodiment of the present invention.

FIG. 3 is a flowchart that illustrates unsolicited resource allocation of a base station and uplink control message transmission of a terminal in accordance with an exemplary embodiment of the present invention.

Referring to FIG. 3, a base station generates a packet data unit (PDU) including a field for indicating an unsolicited resource allocation and a downlink control message for an uplink control message of a terminal at step S300. For this purpose, the base station determines whether an uplink control message is required for a downlink control message when the downlink control message is generated. When the uplink control message is required, the base station may set the field to indicate that unsolicited resource is to be allocated for the uplink control message. The base station may set a PDU to further include a field indicating whether acknowledgement (ACK) message is required for the downlink control message and a field indicating whether or not unsolicited resource is to be allocated for the ACK message.

The base station transmits the generated PDU to the terminal at step S310.

The terminal receives the PDU including the downlink control message from the base station. When an uplink control message is generated at step S320, the terminal checks the field indicting whether the unsolicited resource is to be allocated for the uplink control message at step S330.

When the field indicates that the unsolicited resource is to be allocated for the uplink control message, the terminal waits the solicited resource allocation of the base station for a predetermined time. When the base station allocates resources for the uplink control message to the terminal within a predetermined time at step S340, the terminal transmits an uplink control message using the allocated resources to the base station at step S350. When the field indicates that the unsolicited resource is not to be allocated for the uplink control message, or when the terminal is not allocated with resources from the base station for the uplink control message within a predetermined time, the terminal may request the contention-based resource allocation to the base station.

Figure 4:
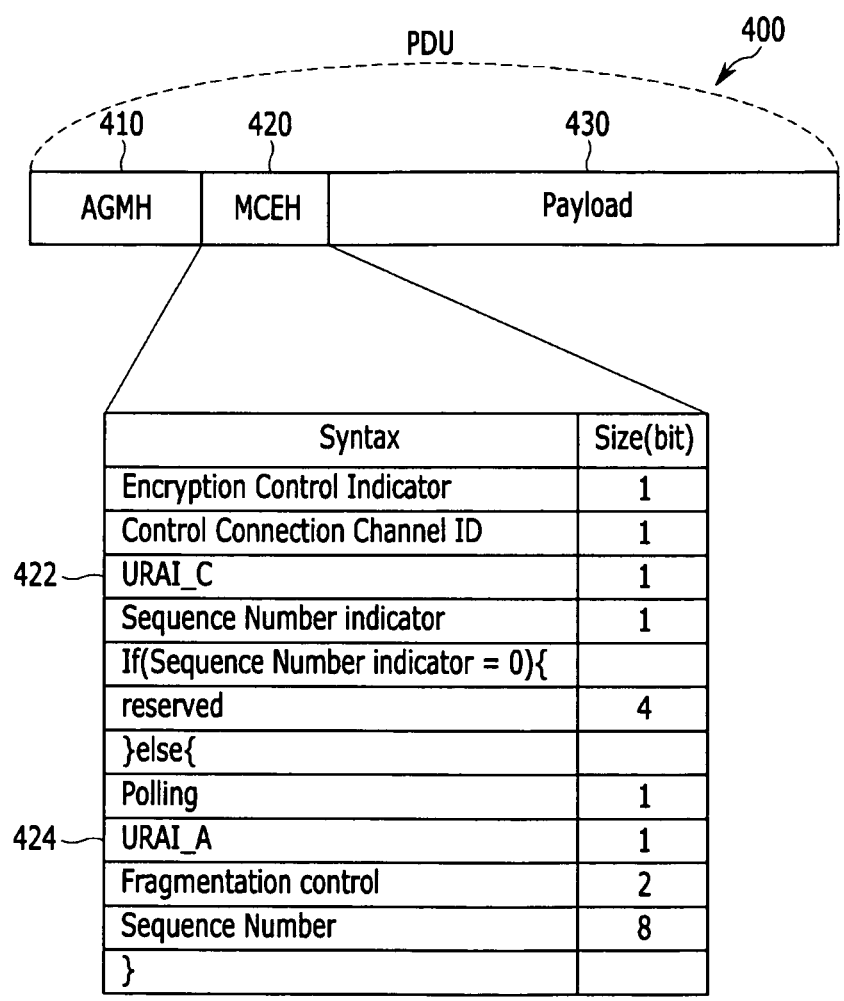
FIG. 4 is a diagram showing a structure of medium access control packet data unit (MAC PDU) that supports unsolicited resource allocation and control message transmission in accordance with an exemplary embodiment of the present invention.

FIG. 4 is a diagram showing a structure of medium access control packet data unit (MAC PDU) that supports unsolicited resource allocation and control message transmission in accordance with an exemplary embodiment of the present invention.

Referring to FIG. 4, a MAC PDU 400 includes Advanced Generic MAC Header (AGMH) 410, a MAC Control Extended Header (MCEH) 420, and a payload 430. The AGMH 410 is a common header, and the MCEH 420 is an extended header. The base station can transmit a downlink control message to the terminal through the MAC PDU 400.

According to the exemplary embodiment of the present invention, the MCEH 420 further includes fields related to unsolicited resource allocation. For example, the fields related to the unsolicited resource allocation include an Unsolicited Resource Allocation Indicator for the next uplink control message (URAI_C) field 422 and an Unsolicited Resource Allocation Indicator for an Acknowledgement (URAI_A) field 424.

The URAI_C field 422 is an unsolicited resource allocation indicator for an uplink control message. That is, the URAI_C field 422 indicates whether uplink resource is to be allocated for an uplink control message or not when there is an uplink control message to receive from the terminal.

The URAI_C field 422 may be 1 bit.

When the URAI_C field 422 is set to 1, the URAI_C field 422 indicates that the base station performs unsolicited resource allocation to allocate uplink resources for an uplink control message of the terminal corresponding to the downlink control message of the base station.

The URAI_A field 424 is an unsolicited resource allocation indicator for response. That is, the URAI_A field 424 indicates whether uplink resource is allocated for the ACK message when it is required to inform the base station that the terminal successfully receives the MAC PDU 400 from the base station.

For this purpose, the base station may set a polling field of the MCEH 420 as 1. When both the polling field of the MCEH 420 and the URAI_A fields 424 are set as 1, it means that the base station performs the unsolicited resource allocation to allocate uplink resource for the ACK message of the terminal.

Furthermore, the MCEH 420 may include an Encryption Control Indicator field, a Control Connection Channel ID field, a Sequence Number Indicator field, a Fragmentation control field, and a Sequence Number field.

Figure 5:
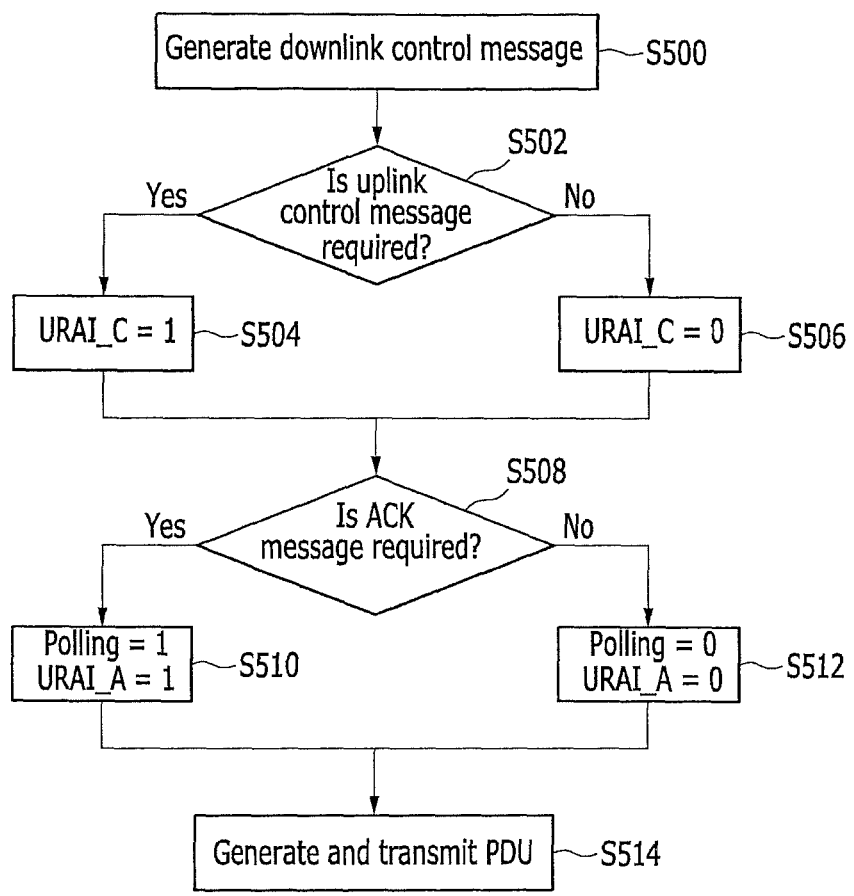
FIG. 5 is a flowchart that illustrates a method for transmitting downlink control message from a base station to a terminal in accordance with an exemplary embodiment of the present invention.

FIG. 5 is a flowchart that illustrates a method for transmitting downlink control message from a base station to a terminal in accordance with an exemplary embodiment of the present invention.

Referring to FIG. 5, when a downlink control message is generated to be transmitted from a base station to a terminal at step S500, the base station determines whether an uplink control message of the terminal for the downlink control message is required or not at step S502.

When the uplink control message of the terminal is required, the base station sets the URAI_C field of the MCEH 420 in the MAC PDU 400 as 1 at step S504. When the uplink control message of the terminal is not required, the base station sets the URAI_C field of the MCEH 420 in the MAC PDU 400 as 0 at step S506.

The base station determines whether it is necessary to determine that the terminal successfully receives the downlink control message or not. That is, the base station determines whether it is necessary to receive an ACK message from the terminal for the downlink control message at step S508.

When the ACK message of the terminal is required, the base station sets the polling field of the MCEH 420 in the MAC PDU 400 as 1, and sets the URAI_A field 424 as 1 at step S510. When the ACK message of the terminal is not required, the base station sets the polling field of the MCEH 420 in the MAC PDU 400 as 0, and sets the URAI_A field 324 as 0 at step S512.

The base station sets other fields of the MCEH 420, generates a MAC PDU 300, and transmits the downlink control message to the terminal at step S514.

Figure 6:
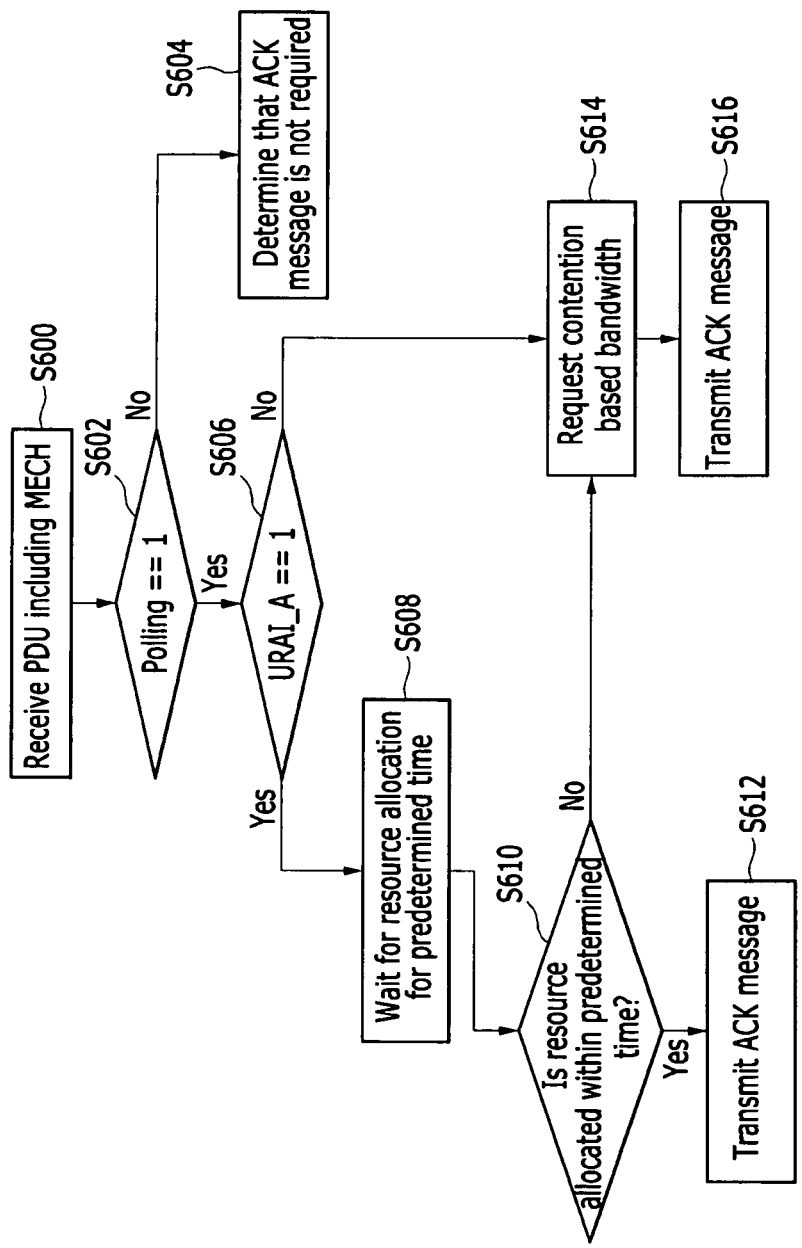
FIG. 6 is a flowchart that illustrates a method for transmitting an ACK message to a downlink control message of a terminal in accordance with an exemplary embodiment of the present invention.

FIG. 6 is a flowchart that illustrates a method for transmitting an ACK message for a downlink control message of a terminal in accordance with an exemplary embodiment of the present invention.

Referring to FIG. 6, a terminal receives a MAC PDU 400 including a MCEH 420 from a base station at step S600.

The terminal checks a polling field of the MCEH 420 at step S602. When the polling field is set as 0, the terminal determines that it is not necessary to transmit an ACK message for a downlink control message at step S604.

On the contrary, when the polling field is set to 1, the terminal checks a URAI_A field 424 of the MCEH 420 at step S606. When the URAI_A field 424 is set as 1, the terminal waits uplink resource allocation for transmitting an ACK message for a predetermined time at step S608.

When uplink resources are allocated from the base station within a predetermined time at step S610, the terminal transmits the ACK message to the base station using the allocated uplink resource at step S612.

On the contrary, when uplink resources are not allocated from the base station within a predetermined time, or when the UARI_A field 424 is set as 0 although the polling field is set as 1, the terminal transmits a contention-based bandwidth request to the base station at step S614. When uplink resource is allocated as a result of requesting the contention-based bandwidth request, the terminal transmits an ACK message to the base station using the allocated uplink resource at step S616.

Figure 7:
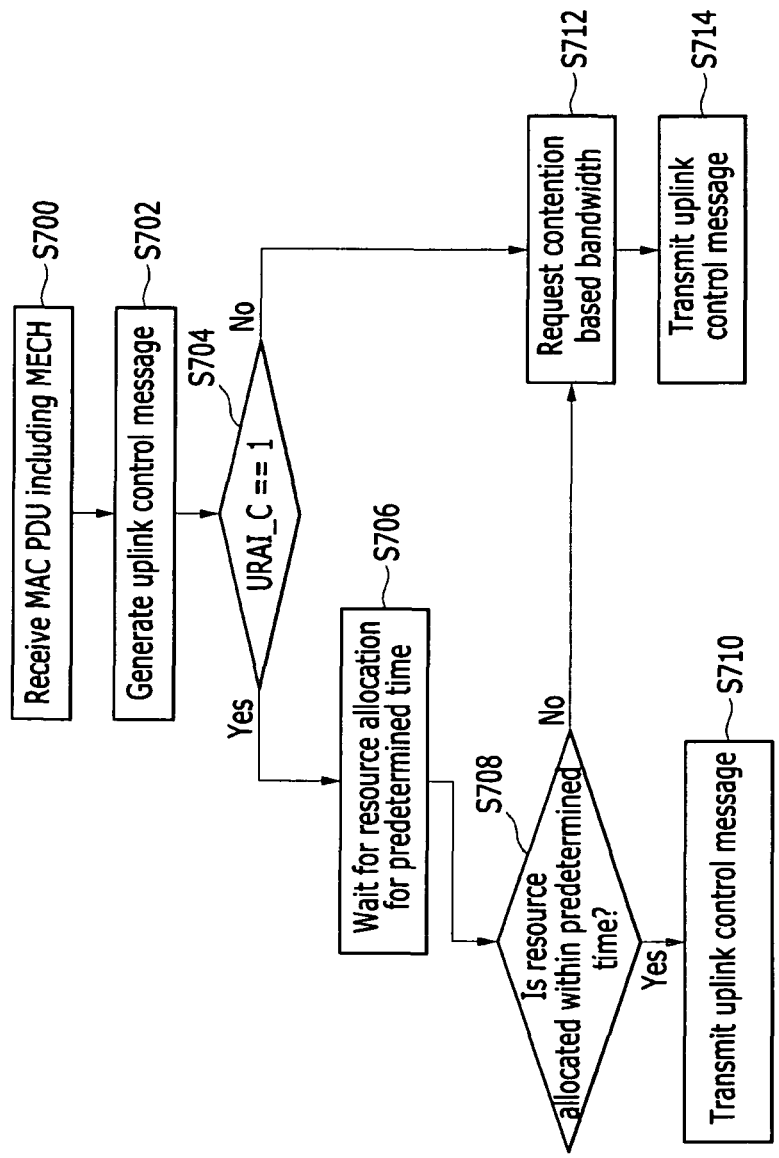
FIG. 7 is a flowchart that illustrates a method for transmitting an uplink control message from a terminal in accordance with an exemplary embodiment of the present invention.

FIG. 7 is a flowchart that illustrates a method for transmitting an uplink control message from a terminal in accordance with an exemplary embodiment of the present invention.

Referring to FIG. 7, a terminal receives a MAC PDU 400 including a MCEH 420 from a base station at step S700.

When an uplink control message to be transmitted from the terminal to the base station is generated at S702, the terminal checks a UARI_C field 422 of the MCEH 420 at step S704. When the UARI_C field 422 is set as 1, the terminal waits uplink resource allocation for transmitting the uplink control message for a predetermined time at step S706.

When uplink resources are allocated from the base station within a predetermined time at step S708, the terminal transmits the uplink control message to the base station using the allocated uplink resource at step S710.

On the contrary, when uplink resources are not allocated from the base station within a predetermined time, or when the UARI_C field 422 is set as 0, the terminal transmits a contention-based bandwidth request to the base station at step S712.

When the uplink resource is allocated as a result of the contention-based bandwidth request, the terminal transmits the uplink control message to the base station using the allocated uplink resource at step S714.

As described above, the base station can perform unsolicited resource allocation for the uplink control message by including the UARI_C field 422 and the UARI_A field in the MCEH 420 of the MAC PDU 400 which transmits the downlink control message according to the exemplary embodiments of the present invention. Accordingly, waste of time and resource can be minimized by reducing frequency of contention-based bandwidth requests for uplink control message FIG. 8 is a flowchart that illustrates a method for solicited resource allocation in accordance with an exemplary embodiment of the present invention.

Figure 8:
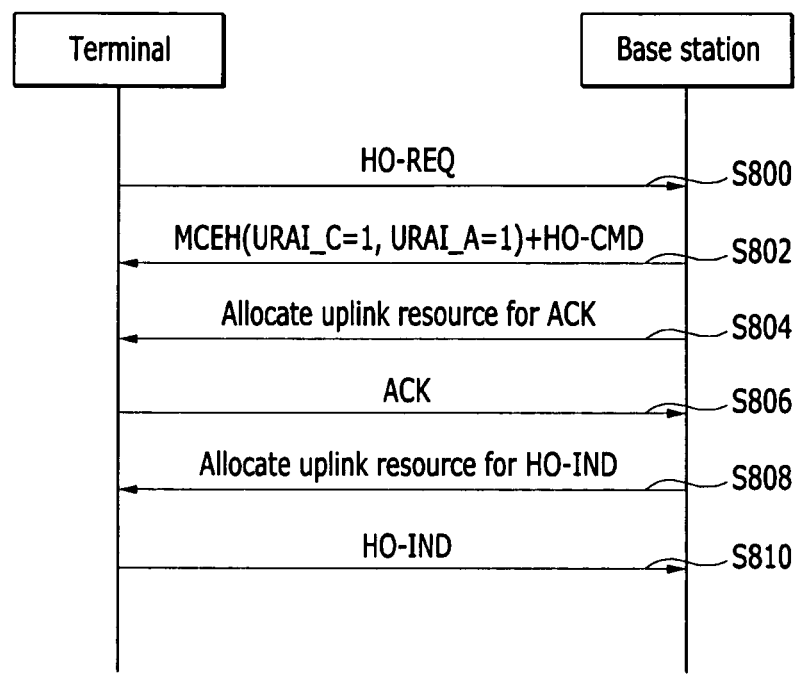
FIG. 8 is a flowchart that illustrates a method for solicited resource allocation in accordance with an exemplary embodiment of the present invention.

Referring to FIG. 8, a terminal transmits a hand-off request (HO-REQ) message to a base station at step S800.

The base station receiving the hand-off request message transmits hand-off command (HO-CMD) message to the terminal at step S802. It is necessary for the base station to determine whether the terminal successfully receives the hand-off command message or not. Accordingly, the base station sets a polling field of a MCEH in the hand-off command message to 1 and sets a UARI_A field to 1. Further, when the terminal receives the hand-off command message, it is necessary for the terminal to transmit a hand-off indication (HO-IND) message. Accordingly, the base station may set an UARI_C field of the MCEH in the hand-off command message to 1.

Based on the polling field, the terminal can be aware of that it is necessary to send an ACK message for the hand-off command message. Further, based on the UARI_A field, the terminal can be aware of that the base station will allocate uplink resources for the ACK message. Therefore, when the terminal is allocated with uplink resources for the ACK message from the base station within a predetermined time S804, the terminal transmits the ACK message to the base station using the allocated uplink resource at step S806.

Based on the UARI_C field, the terminal can be aware of that the base station will allocate uplink resources for the hand-off indication message. Therefore, when the terminal is allocated with uplink resources for the hand-off indication message from the base station within a predetermined time at step S808, the terminal transmits the hand-off indication message to the base station using the allocated uplink resource at step S810.

The base station can allocate uplink resources for transmitting a control message to the terminal although the base station does not receive a contention-based bandwidth allocation request from the terminal. The terminal can transmit a control message to the base station using uplink resource allocated from the base station without the contention-based bandwidth allocation request procedure. Accordingly, it reduces a delay time for transmitting control message and prevents waste of resource.

The apparatus and method according to an exemplary embodiment of the present invention described above can be realized as a program performing functions corresponding to configuration elements of the apparatus and method or as a computer readable recording medium storing the program.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for allocating resources for an uplink control message at base station, the method comprising:
   generating a packet data unit that includes a first field and a downlink control message, wherein the first field indicates whether unsolicited resource is to be allocated for an uplink control message;
   transmitting the generated packet data unit to a terminal;
   allocating resources for the uplink control message; and
   transmitting the allocated resources to the terminal,
   wherein the packet data unit further includes a second field and a third field, the second field indicates whether or not an acknowledgement (ACK) message for the downlink control message is required, and the third field indicates whether or not unsolicited resource is to be allocated for the ACK message,
   wherein the generating a packet data unit includes:
   determining whether or not an uplink control message for the downlink control message is required when the downlink control message is generated; and
   setting the first field to indicate that the unsolicited resource allocation is to be performed for the uplink control message when the uplink control message is required.

2. The method of claim 1, wherein the first field is included in an extended header of the packet data unit.

3. The method of claim 1, wherein the generating a packet data unit further includes:
   determining whether the ACK message for the downlink control message is required; and
   when the ACK message is required, setting the second field to indicate that the ACK message is required, and setting the third field to indicate that unsolicited resource is to be allocated for the ACK message.

4. The method of claim 1, wherein the second field and the third field are included in an extended header of the data packet.

5. A method for transmitting an uplink control message at a terminal, the method comprising:
   receiving a packet data unit including a first field and a downlink control message, wherein the first field indicates whether or not a base station allocates unsolicited resource for the uplink control message;
   checking the first field when the uplink control message is generated;
   waiting unsolicited resource allocation to transmit the uplink control message for a first time when the first field indicates that the base station would allocate unsolicited resource for the uplink control message; and
   when the base station allocates resources for the uplink control message within the first time, transmitting the uplink control message using the allocated resources,
   wherein the packet data unit further includes a second field and a third field, the second field indicates whether or not an acknowledgement (ACK) message for the downlink control message is required, and the third field indicates whether or not unsolicited resource is to be allocated for the ACK message,
   wherein determining whether the ACK message for the downlink control message is required based on the second field;
   checking the third field when the ACK message is required;
   when the third field indicates that unsolicited resource is to be allocated for the ACK message, waiting unsolicited resource allocation for transmitting the ACK message for a second time;
   when resource for transmitting the ACK message is allocated from the base station within the second time, transmitting the ACK message using the allocated resource; and
   when resources for transmitting the ACK message are not allocated from the base station within the second time, transmitting a contention-based resource allocation request for the ACK message.

6. The method of claim 5, further comprising:
   transmitting a contention-based resource allocation request for the uplink control message to the base station when resource for the uplink control message is not allocated from the base station within the first time.

7. The method of claim 5, further comprising:
   transmitting a contention-based resource allocation request for the uplink control message to the base station when the first field does not indicates that the base station would allocate unsolicited resource for the uplink control message.

8. The method of claim 5, further comprising:
   when the third field does not indicate that the base station would allocate unsolicited resource for the ACK message, transmitting a contention-based resource allocation request for the ACK message to the base station.

* * * * *